United States Patent

Baumann et al.

[11] Patent Number: 5,792,963
[45] Date of Patent: Aug. 11, 1998

[54] METHOD FOR DETERMINING GAS MASS FLOWS BY USE OF A TRACER GAS

[75] Inventors: Peter Baumann, Sulz; Francisco L. Blangetti, Baden, both of Switzerland

[73] Assignee: Asea Brown Boveri AG, Baden, Switzerland

[21] Appl. No.: 577,661

[22] Filed: Dec. 22, 1995

[30] Foreign Application Priority Data

Dec. 22, 1994 [EP] European Pat. Off. ............ 94810745

[51] Int. Cl.$^6$ ...................................................... G01F 1/00
[52] U.S. Cl. ................................... 73/861.04; 73/861.05
[58] Field of Search .......................... 73/861.04, 861.05, 73/861.07

[56] References Cited

U.S. PATENT DOCUMENTS 3,881,351  5/1975  Prachar .............................. 73/861.04
5,190,726  3/1993  Shinoki et al. ..................... 73/861.04

Primary Examiner—Richard Chilcot
Assistant Examiner—Harshad Patel
Attorney, Agent, or Firm—Oblon, Spivak, McClelland, Maier & Neustadt, P.C.

[57] ABSTRACT

In the case of the method for determining the total mass flow of a gas mixture (2) which flows through a line (1) under pressure, a gas contained in the gas mixture is used as tracer (3). With the aid of pressure measurements (9, 10) of the gas mixture, total pressure and of the tracer partial pressure, the molar proportions of the tracer in the gas mixture are first ascertained. In this case the pressure measurements take place during a first phase, with the line system (1) gas-tight, and in a further phase with the system enriched with tracer.

Solving the mass balances for the gas mixture and for the tracer makes it possible, by substituting the already determined tracer molar proportions, to calculate the total mass flow.

Tracer enrichment of the gas mixture is carried out at supercritical pressure ratios between the vacuum prevailing in the line and the pressure of the tracer to be fed in by a critical orifice (4) which is built into the line (1) upstream of the pressure measurement locations (9, 10).

4 Claims, 2 Drawing Sheets

METHOD FOR DETERMINING GAS MASS FLOWS BY USE OF A TRACER GAS

BACKGROUND OF THE INVENTION

1. Field of the Invention

The invention relates to a method for determining the total mass flow of a gas mixture flowing through a line under vacuum, by using as tracer a gas contained in this gas mixture, the components of the gas mixture being known.

2. Discussion of Background

A method of this type is known from power stations for ascertaining the gas mass flow in air vent pipes of condensers. In this case the gas mixture essentially consists of steam and air. The mass flow is customarily ascertained using a quadrupole mass spectrometer, with helium being used as tracer gas.

The measurement method requires extensive measuring equipment and a specialist for calibrating and operating the spectrometer.

The outlay involved with such a measurement is consequently so high that regular diagnostic measurements, or permanent monitoring according to the abovedescribed type is uneconomical and therefore seldom carried out.

SUMMARY OF THE INVENTION

Accordingly, one object of the invention is to provide a novel method, with which the gas mass flows components are first known.

According to the invention, this is achieved by the defining features.

In this case pressure measurements are carried out, in a system carrying a gas flow and under vacuum, once with the system gas-tight relative to the system surroundings, and the gas mixture is subsequently enriched continuously with a defined tracer gas flow upstream of the pressure-measurement location, before the pressure measurements are repeated.

The molar proportions of the tracer and the mass balances of the total system and of the tracer, which are determined from the pressure measurements, in particular make it possible to calculate the total mass flow of the gas mixture.

The advantages of the invention are primarily seen in the simple layout and operation of the measuring equipment which, at best, for example in the case of measurements in power station condenser systems, consists of two pressure gages and a critical orifice, oxygen being used as tracer and, in the presence of a supercritical pressure ratio, atmospheric air whose oxygen proportion is assumed to be 21% being fed to the gas mixture.

BRIEF DESCRIPTION OF THE DRAWINGS

A more complete appreciation of the invention and many of the attendant advantages thereof will be readily obtained as the same becomes better understood by reference to the followed detailed description when considered in connection with the accompanying drawings, which schematically represent two exemplary embodiments of the invention with reference to a power station application, and wherein.

Only those elements essential for understanding of the invention are shown, and the flow directions of the working media are identified with arrows.

DESCRIPTION OF THE PREFERRED EMBODIMENTS

Figure 1:
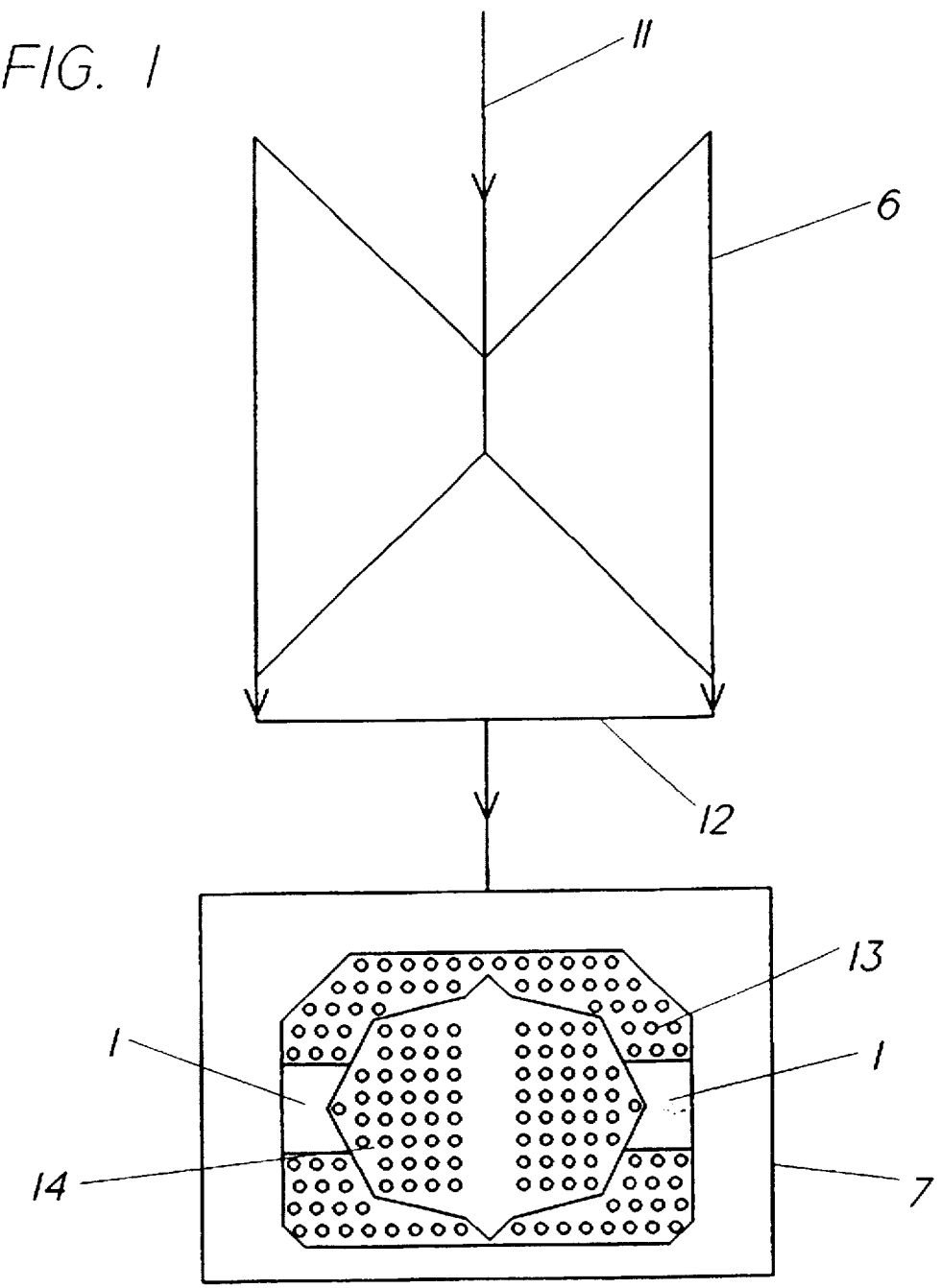
FIG. 1 shows a low-pressure turbine with connected condenser.

Referring now to the drawings, wherein like reference numerals designate identical or corresponding parts throughout the several views, according to FIG. 1 a low-pressure turbine of a power station is represented in simplified fashion by the reference 6. Steam flows to it from the line 11. The expanded steam flows on through the lines 12 and is subsequently condensed in the condenser bundles 13 of the condenser 7. Noncondensable gases contained in the steam are discharged through the suction line 1 connected to the air cooler 14.

Figure 2:
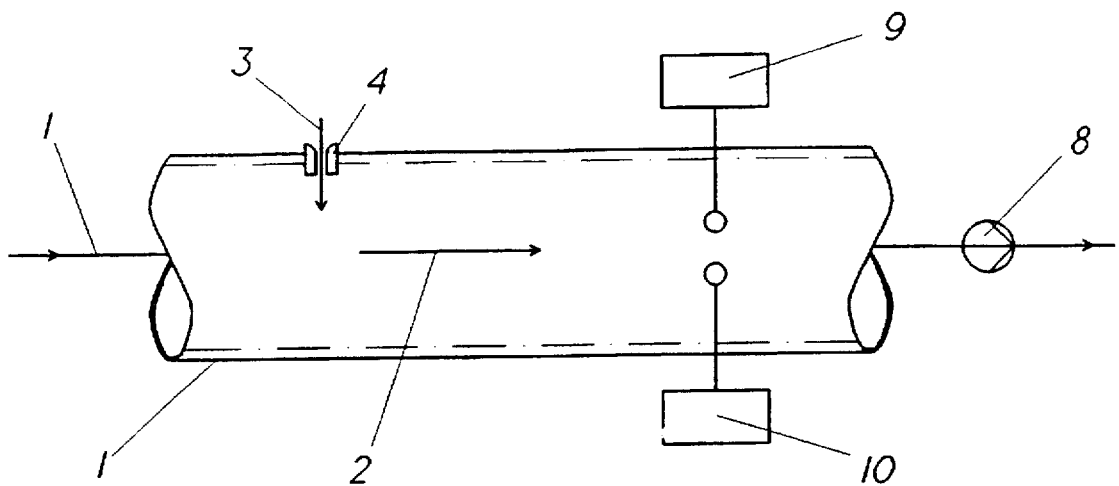
FIG. 2 shows a suction line of the condenser with a measuring instrument.

The way of ascertaining the mass flow in the suction line 1 is now explained with the aid of the exemplary embodiment in FIG. 2, in which a constant tracer molar flow 3 flow into the line through a critical orifice 4.

A precondition for this is that the pressure ratio between the vacuum in the suction line 1 and its atmospheric surroundings is supercritical. For atmospheric air, this material-dependent, supercritical pressure ratio of internal pressure to external pressure of the suction line 1 must be less than 0.528, which condition is satisfied in the case of suction lines with a typical internal pressure of 0.2 µbar and an atmospheric external pressure of 1 bar.

According to this precondition, as required, by means of the closable critical orifice 4 which connects the vacuum in the line to the atmosphere surrounding the line upstream in the gas mixture flow, air with oxygen as tracer 3 is fed to the gas mixture 2. The enrichment of the gas mixture takes place through the orifice 4 with a continuous, defined air molar flow.

Two series of measurements are first carried out in the suction line 1 under vacuum. In this case the gas mixture total pressure is determined using a pressure-measurement system 9 and the partial pressure of the oxygen, which is here used as tracer and is referred to thus below, is determined using a pressure-measurement system 10. The pressure-measurement system 9 is a barometric standard pressure-measurement system and the pressure-measurement system 10 is an oxygen partial-pressure gage.

The following conventions are used for the subsequent considerations:

A/AT: oxygen/tracer partial pressure, first measurement
B: gas mixture total pressure, first measurement
C/CT: oxygen/tracer molar component, first measurement
D/DT: oxygen/tracer molar flow, first measurement
E: total molar flow, first measurement
F/FT: oxygen/tracer partial pressure, second measurement
G: gas mixture total pressure, second measurement
H/HT: oxygen/tracer molar component, second measurement
I/IT: oxygen/tracer molar flow, second measurement
J: total molar flow, second measurement
K/KT: air molar flow/tracer molar flow
L: total mass flow
M: mean molar mass of the gas mixture
N: nitrogen molar component, 79% in air
P: steam molar component In the first series of measurements, the gas mixture total pressure B and the oxygen partial pressure A are now measured, the critical orifice '4 being closed and the measurements therefore being taken without tracer-enrichment of the gas mixture.

The molar proportion of oxygen is now calculated from the ratio of the oxygen partial pressure to the gas mixture total pressure as:

$$C=A/B \quad (I)$$

The oxygen molar flow is to a large extent given from the ratio of the molar flows by:

$$C=D/E \quad (II)$$

If the critical orifice 4 upstream of the pressure-measurement locations 9 and 10 is now opened to the atmospheric surroundings, then the gas mixture total pressure and, because of the air flowing in, the oxygen partial pressure, are increased.

The second series of measurements is taken in the air-enriched system by measuring the gas mixture total pressure G and the oxygen partial pressure F. The oxygen molar proportion is then given as:

$$H=F/G \quad (III)$$

In addition, the oxygen molar proportion is now given from the ratio of the molar flows by:

$$H=I/J \quad (IV)$$

The difference in the total molar flows J and E represents the air molar flow K flowing in and is, equally, the mass balance of the total system:

$$J-E=K \quad (V)$$

If the oxygen proportion of the air is considered to be 21%, then the oxygen balance can be ascertained using equation V from the difference in the oxygen molar flows I in the enriched state and D in the nonenriched state, as:

$$I-D=0.21K \quad (VI)$$

If I and D are introduced from equations II and IV into VI, then this gives:

$$0.21K=JH-EC \quad (VII)$$

If J is now substituted using the mass balance V, then:

$$0.21K=H(K+E)-EC \quad (VIII)$$

whence the total molar flow from the first measurement becomes:

$$E=K(0.21-H)/(H-C) \quad (IX)$$

and multiplication of the total molar flow by the mean molar mass of the total gas mixture M gives, for the total mass flow L:

$$L=EM=MK(0.21-H)/(H-C) \quad (X)$$

In this case, the mean molar mass of the gas mixture is calculated from the following relationships:

The sum of the molar proportions of the components contained in the gas mixture in the suction line, i.e. steam, nitrogen and oxygen is equal to 1:

$$P+C+N=1 \quad (XI)$$

the nitrogen molar flow being in addition given by:

$$N=C0.79/0.21 \quad (XII)$$

The mean molar mass is now given, considering the air molar mass as 28.96 and the water molar mass as 18.003, as:

$$M=28.96(C+N)+18.003P \quad (XIII)$$

and with $$P=1-C-N \quad (XIV)$$

from equation XI and N from equation XII, the following is obtained for the mean molar mass of the gas mixture:

$$M=18.003+52.18C \quad (XV)$$

with which the total mass flow L is ascertained.

Figure 3:
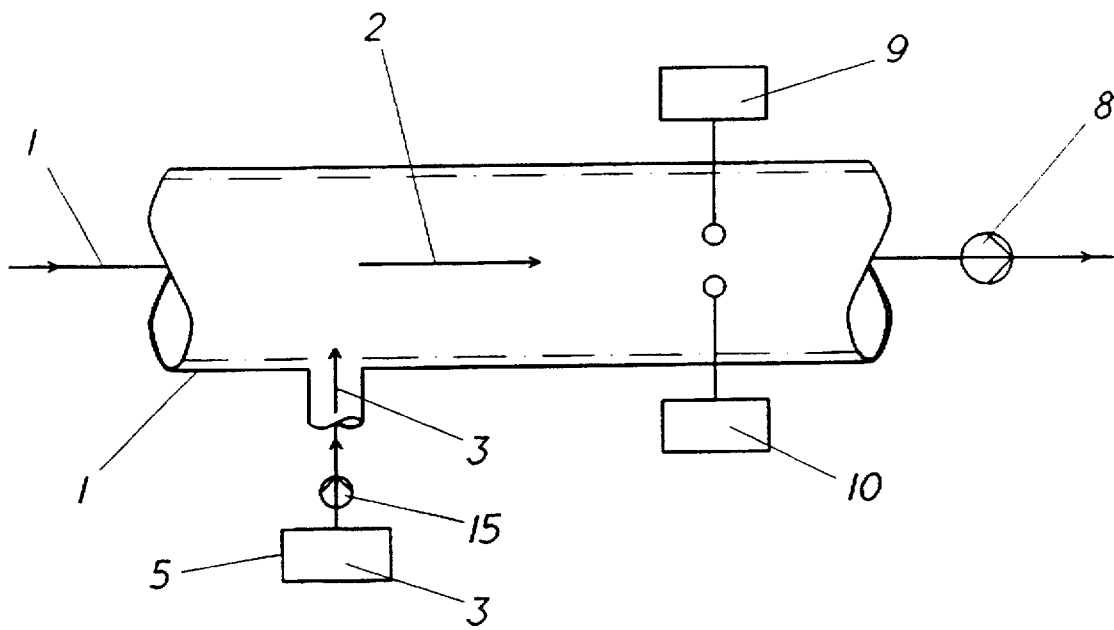
FIG. 3 shows an alternative embodiment of the suction line according to FIG. 2.

If the pressure ratio between the vacuum in the suction line 1 and the tracer 3 to be fed in is not supercritical, then, according to FIG. 3, a constant-volume flow pump 15 is fitted between a container 5 containing the tracer and the suction line 1. By means of this, as required, the gas mixture is continuously enriched with a defined molar flow of the tracer 3, before the series of pressure measurements for the enriched gas mixture is carried out.

Although the described examples have been drawn from the field of power stations, the application of the method to determining the total mass flow of flowing gas mixtures is in no way restricted to these cases, it being possible for gases other than oxygen to fulfil the tracer function.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by Letters Patent of the United States is:

1. A method for determining the total mass flow of a gas mixture flowing through a line under vacuum, by using a known component of the gas mixture as a tracer, comprising the sequential steps of:

measuring the total pressure of the gas mixture and the partial pressure of the component in the line, determining the proportion of the partial pressure of the component to the total pressure in an unenriched gas mixture, feeding a defined flow of the component as a tracer to the gas mixture at a position upstream of the measurement site for the pressure measurements, as a result of which the partial pressure of the component as a tracer and the total pressure of the gas mixture increase to form an enriched gas mixture, measuring the total pressure of the enriched gas mixture and the partial pressure of the component as a tracer contained in the enriched gas mixture in the line, determining a proportion of the component as a tracer in the enriched gas mixture from the ratio of the component as a tracer partial pressure to the total pressure of the enriched gas mixture, determining the proportions of the component as a tracer in the enriched gas mixture using the ratios of the flows of the component as a tracer to gas mixture, and determining the total mass flow of the gas mixture from the proportions of the gas including the component as a tracer in the enriched gas mixture.

2. The method as claimed in claim 1, wherein the proportion of the tracer (CT) when the gas mixture is not enriched with the component as a tracer is given on the basis of the pressure ratio of the tracer partial pressure (AT) to the total pressure (B) by:

$$CT = AT/B,$$

and, in addition, the proportion of the component as a tracer (CT) is given on the basis of the ratio of the flows of the flow (DT) of the component as a tracer to the total flow (E) by:

$$CT = DT/E,$$

and, when the gas mixture is enriched with the component as a tracer, the proportion of the component as a tracer (HT) is given on the basis of the pressure ratio of the tracer partial pressure (FT) to the total pressure (G) by:

$$HT = FT/G,$$

and, in addition, the proportion (HT) of the component as a tracer is given on the basis of the ratio of the flows of the flow (IT) of the component as a tracer to the total flow (J) by:

$$HT = IT/J,$$

and wherein, using the mass balance of the total mass flow and that of the component as a tracer, the total mass flow (L) is given by:

$$L = KTM(1-HT)/(HT-CT),$$

with

KT: flow of the component as a tracer fed in and

M: mean molar mass of the gas mixture.

3. The method as claimed in claim 1, in which oxygen functions as the component as a tracer and the pressure ratio between the internal pressure of the line and the surrounding atmosphere is supercritical, wherein atmospheric air having a known oxygen proportion flows into the line through a closable critical orifice for defined enrichment of the gas mixture.

4. The method as claimed in claim 1, wherein the defined enrichment of the gas mixture with the component as a tracer is carried from a container using a positive displacement pump.

* * * * *